United States Patent
Hillman

(10) Patent No.: US 11,620,765 B2
(45) Date of Patent: *Apr. 4, 2023

(54) AUTOMATIC DETECTION OF A CALIBRATION OBJECT FOR MODIFYING IMAGE PARAMETERS

(71) Applicant: UNITY TECHNOLOGIES SF, San Francisco, CA (US)

(72) Inventor: Peter Hillman, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/065,439

(22) Filed: Oct. 7, 2020

(65) Prior Publication Data
US 2022/0005224 A1 Jan. 6, 2022

Related U.S. Application Data

(60) Provisional application No. 63/047,868, filed on Jul. 2, 2020.

(51) Int. Cl.
| | |
|---|---|
| *G06T 7/80* | (2017.01) |
| *H04N 9/68* | (2006.01) |
| *H04N 9/73* | (2006.01) |
| *H04N 5/235* | (2006.01) |
| *G06T 7/90* | (2017.01) |

(52) U.S. Cl.
CPC .................. *G06T 7/80* (2017.01); *G06T 7/90* (2017.01); *H04N 5/2353* (2013.01); *H04N 9/68* (2013.01); *H04N 9/735* (2013.01)

(58) Field of Classification Search
CPC ........ H04N 5/2353; H04N 9/735; G06T 7/80; G06T 7/11; G06T 7/162; G06T 7/19
See application file for complete search history.

(56) References Cited

U.S. PATENT DOCUMENTS 8,290,258 B1 * 10/2012 Polonsky ............. H04N 1/6027
358/1.9
9,349,297 B1 * 5/2016 Ortiz ......................... G06T 7/12
(Continued)

FOREIGN PATENT DOCUMENTS

EP 2 940 626 A2 11/2015

OTHER PUBLICATIONS https://xritephoto.com—Colorchecker Classic—Camera & Image Calibration: X-Rate Photo & Video—4 pages.

*Primary Examiner* — Brian P Yenke
(74) *Attorney, Agent, or Firm* — Trellis IP Law Group, PC

(57) ABSTRACT

Embodiments provide for automated detection of a calibration object within a recorded image. In some embodiments, a system receives an original image from a camera, wherein the original image includes at least a portion of a calibration chart. The system further derives a working image from the original image. The system further determines regions in the working image, wherein each region comprises a group of pixels having values within a predetermined criterion. The system further analyzes two or more of the regions to identify a candidate calibration chart in the working image. The system further identifies at least one region within the candidate calibration chart as a patch. The system further predicts a location of one or more additional patches based on at least the identified patch.

20 Claims, 7 Drawing Sheets

(56) References Cited

U.S. PATENT DOCUMENTS

| | | | |
|---|---|---|---|
| 10,108,876 B2* | 10/2018 | Shtok | G06V 10/56 |
| 10,121,262 B2* | 11/2018 | Katchalov | G06T 7/37 |
| 10,275,898 B1* | 4/2019 | Song | H04N 13/254 |
| 10,417,752 B2* | 9/2019 | Fors | G06T 11/001 |
| 10,504,244 B2* | 12/2019 | Bao | G06T 7/11 |
| 10,712,203 B2* | 7/2020 | Okada | G01J 3/524 |
| 11,170,523 B2* | 11/2021 | Gimpelson | G06T 7/70 |
| 11,328,437 B2* | 5/2022 | Hillman | G06T 11/001 |
| 2004/0150641 A1* | 8/2004 | Duiker | G06T 15/20 |
| | | | 345/426 |
| 2008/0046217 A1* | 2/2008 | Polonskiy | G01J 3/2823 |
| | | | 702/179 |
| 2009/0128649 A1* | 5/2009 | Osorio | H04N 1/6083 |
| | | | 348/222.1 |
| 2009/0257652 A1* | 10/2009 | Liu | H04N 1/6027 |
| | | | 382/167 |
| 2010/0329646 A1* | 12/2010 | Loeffler | H04N 21/854 |
| | | | 382/167 |
| 2011/0187891 A1* | 8/2011 | Zhang | H04N 9/73 |
| | | | 348/E9.051 |
| 2013/0336583 A1* | 12/2013 | Ernst | G06V 10/751 |
| | | | 382/218 |
| 2014/0211022 A1* | 7/2014 | Koh | H04N 1/6033 |
| | | | 348/188 |
| 2014/0286569 A1 | 9/2014 | Devic et al. | |
| 2017/0318240 A1* | 11/2017 | Yu | G06V 10/42 |
| 2018/0075603 A1* | 3/2018 | Hougen | G06T 7/35 |
| 2018/0080829 A1* | 3/2018 | Tanimura | G01J 3/46 |
| 2019/0066338 A1 | 2/2019 | Perlman et al. | |
| 2019/0306477 A1* | 10/2019 | Nordback | H04N 9/3182 |
| 2020/0160560 A1* | 5/2020 | Besley | H04N 5/23267 |
| 2020/0374447 A1* | 11/2020 | Lu | H04N 5/2354 |
| 2021/0241422 A1* | 8/2021 | Burke, III | G06T 3/0093 |
| 2022/0020176 A1* | 1/2022 | Hillman | G06T 7/90 |
| 2022/0116584 A1* | 4/2022 | St. John | G06V 20/584 |
| 2022/0365186 A1* | 11/2022 | Schwiesow | G06T 7/97 |

* cited by examiner

AUTOMATIC DETECTION OF A CALIBRATION OBJECT FOR MODIFYING IMAGE PARAMETERS

CROSS-REFERENCE TO RELATED APPLICATIONS

This application claims priority from U.S. Provisional Patent Application No. 63/047,868, entitled "AUTOMATIC DETECTION OF A CALIBRATION OBJECT FOR MODIFYING IMAGE PARAMETERS," filed Jul. 2, 2020 (WD0037PP1), which is hereby incorporated by reference as if set forth in full in this application for all purposes.

BACKGROUND

Visual productions such as movies, videos, etc., require proper lighting for cameras to adequately capture people and objects in scenes. Even with proper lighting, the same object or objects captured in images may look different in different images depending on the cameras that captured the images. This may be due to image parameter values or operations varying from camera to camera. Variances in image parameters are typically corrected by manual adjustment of cameras or other equipment by artists or managers. Such adjustments may be imprecise, and cause delays in a visual production.

SUMMARY

Embodiments provide for automated detection of a calibration object within a recorded image, which may be used for various purposes such as modifying image parameters to make image capture more accurate and/or uniform. In some embodiments, a system receives an original image from a camera, wherein the original image includes at least a portion of a calibration chart. The system further derives a working image from the original image. The system further determines regions in the working image, wherein each region comprises a group of pixels having values within a predetermined criterion. The system further analyzes two or more of the regions to identify a candidate calibration chart in the working image. The system further identifies at least one region within the candidate calibration chart as a patch. The system further predicts a location of one or more additional patches based on at least the identified patch.

DETAILED DESCRIPTION OF EMBODIMENTS

Various embodiments can replace or assist manual exposure and/or color correction processes. A calibration object used in a scene can be a calibration chart in the style of a so-called "Macbeth" chart, which may be a 4 by 6 grid of square patches. The particular dimensions of the grid may vary. In some embodiments, six of the patches form a uniform gray lightness scale, and another six are primary colors typical of chemical photographic processes—red, green, blue, cyan, magenta, and yellow. The remaining colors may include approximations of medium light and medium dark human skin, blue sky, the front of a typical leaf, and a blue chicory flower. In some embodiments, other patches may be chosen arbitrarily to represent a gamut of general interest and utility for test purposes. Orange and yellow patches may be similarly colored to typical oranges and lemons. As described in more detail herein, the system is designed to locate a calibration chart in an image. Although particular types of charts such as a Macbeth chart are described as examples, it should be apparent that other types of charts or objects may be used.

Figure 1:
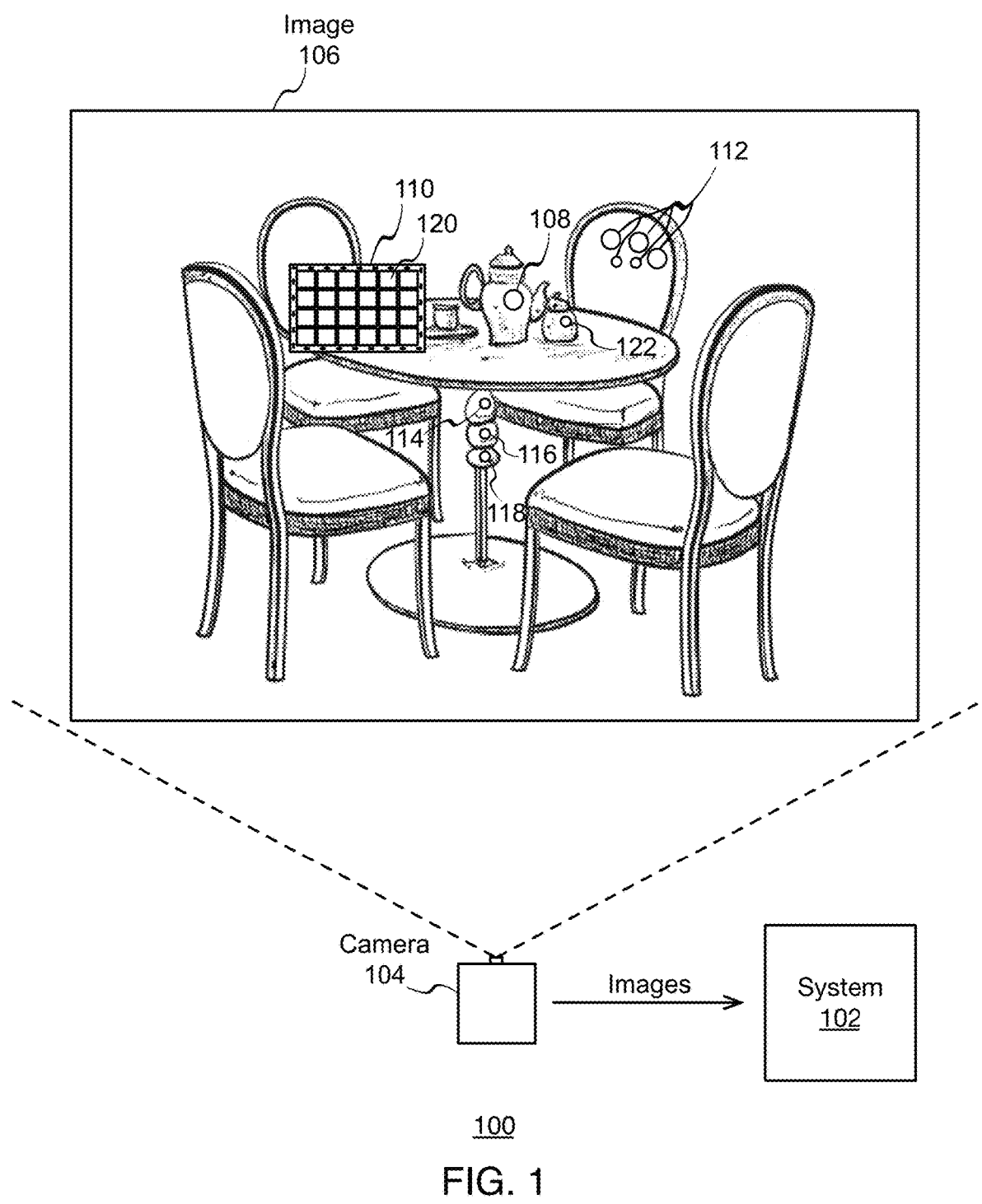
FIG. 1 is a block diagram of an example environment for detection of a calibration object in an image, which may be used for embodiments described herein.

FIG. 1 is a block diagram of an example environment 100 for detection of a calibration object in an image, which may be used for embodiments described herein. Shown in FIG. 1 is system 102, which receives images from camera 104. Also shown is a scene with objects that camera 104 captures in an image 106.

In various embodiments, environment 100 may include any type and number of subjects, objects, lighting effects, etc. In an embodiment, the image is a still image of a movie set to be used in a subsequent movie or video recording. In other embodiments, features described herein may operate on a sequence of images such as a video. In other embodiments, features may be performed in real time, or near real time, rather than substantially after a still image is captured and before live action shooting begins.

For ease of illustration, one camera is shown. In other embodiments, camera 104 may represent any number of cameras, which may be of the same type of camera or may be of multiple types of cameras. Such cameras may include stand-alone cameras that can capture photos or video, dedicated video cameras, motion picture cameras, and/or other types of cameras. In other embodiments, some or all processing steps performed by system 102 may be performed by one or more digital processors in, at, or proximate to the camera.

Image 106 is processed to identify various regions such as regions 108, 112, 114, 116, 118 and 122, in a scene or shot captured in environment 100. These regions are groupings of pixels of similar color and/or grayscale. As described in more detail herein, system 102 may create the regions by grouping sets of adjacent pixels whose values fall within and/or meet predetermined criterion, or above or below threshold values. For example, region 108 on the teapot is an area of white represented by pixel values that vary because of the curvature of the teapot and the position of the light sources. A single region 108 is defined by using predetermined pixel value criterion and/or threshold settings. Similarly region 122 on the sugar bowl is identified based on other, or the same, criterion or threshold pixel values or other mathematical or logical criteria whether presently known or future-developed.

The region breakdown proceeds to identify many regions in the scene. There may be thousands or tens of thousands or more regions identified. The purpose of the region breakdown and some of the subsequent steps described below is to correctly identify the calibration chart 110 in the image by identifying color/grayscale patches such as patches 120 (e.g., color/grey scale patches in a Macbeth chart and the like). Ideally, enough regions of calibration chart 110 will be identified (and other regions rejected) to determine the correct position and orientation of chart 110 in image 106. Such identification and rejection can be difficult where patterns in image 106 are similar to calibration chart 110. For example, a plaid fabric pattern on the chairs can result in multiple regions 112 being identified in a regular array of different colors. Another example is regions 114, 116 and 118 on the table leg having different colors which, when identified as regions, may be later mistaken as color patches in a calibration chart. Many such visual similarities present obstacles to automated image detection including lighting effects (shadows, bright spots), noise, material reflective properties, etc.

As indicated above, at least one object captured in image 106 by camera 104 is a calibration object such as calibration chart 110. In some embodiments, calibration chart 110 is a predetermined chart including known color patches 120. The color patches may be identified by their position in the chart regardless of environment (e.g., lighting) or camera settings. For example, it would be known that the patch in the lower-left corner of the chart is a light gray. In general, any organization of colors in known positions or relationships may be used. Alternatively, in some embodiments, objects other than a "chart" may be used. For example, in some embodiments, three-dimensional objects such as spheres, cubes, etc., may be use for calibrating scenes for three-dimensional capture such as in 3D or virtual reality recording. In various embodiments, calibration chart 110 is placed in the scene for at least one captured image 106 of a series of images. The captured image that includes calibration chart 110 may be referred to as a source image in that the image provides a source of calibration information for corrections of one or more image parameters. The system may initially apply such corrections to the source image and ultimately to an entire series of related images that do not include a calibration. Because the related images are captured by the same camera, the correction being applied to all images appropriately corrects the image parameters in the same manner. Such image parameters may include brightness, white balancing, exposure, etc.

In various embodiments, system 102 obtains image 106, which shows various objects, and identifies calibration chart 110 in the image. System 102 identifies patches 120 (enclosed by dotted lines) in calibration chart 110. As described in more detail herein, system 102 determines one or more colors from the patches. System 102 then determines at least one correction to at least one image parameter associated with image 106 based on patches 120 in calibration chart 110. Further embodiments directed to correcting image parameters of an image are described in more detail herein.

Also shown in FIG. 1 are regions 122, 124, 126, and 128 (indicated by or delineated by dashed lines) of image 106. In various embodiments, system 102 generates the regions (e.g., regions 108, 112, 114, 116, 118, etc.) to analyze image 106, identifies calibration chart 110 and patches 120, and determines various position information associated with calibration chart 110 and patches 120.

For ease of illustration, 4 regions are shown. The number of regions that the system delineates in image 106 may vary, and the particular number of regions will depend on the particular implementation. Various embodiments directed to regions 112, 114, 116, and 118 are described in more detail herein.

For ease of illustration, FIG. 1 shows one block for each of system 102, camera 104, and calibration chart 110. Blocks 102, 104, and 110 may represent multiple systems, cameras, and calibration charts. Also, there may be any number of objects captured in image 106. In other implementations, environment 100 may not have all of the components shown and/or may have other elements including other types of elements instead of, or in addition to, those shown herein.

Figure 2:
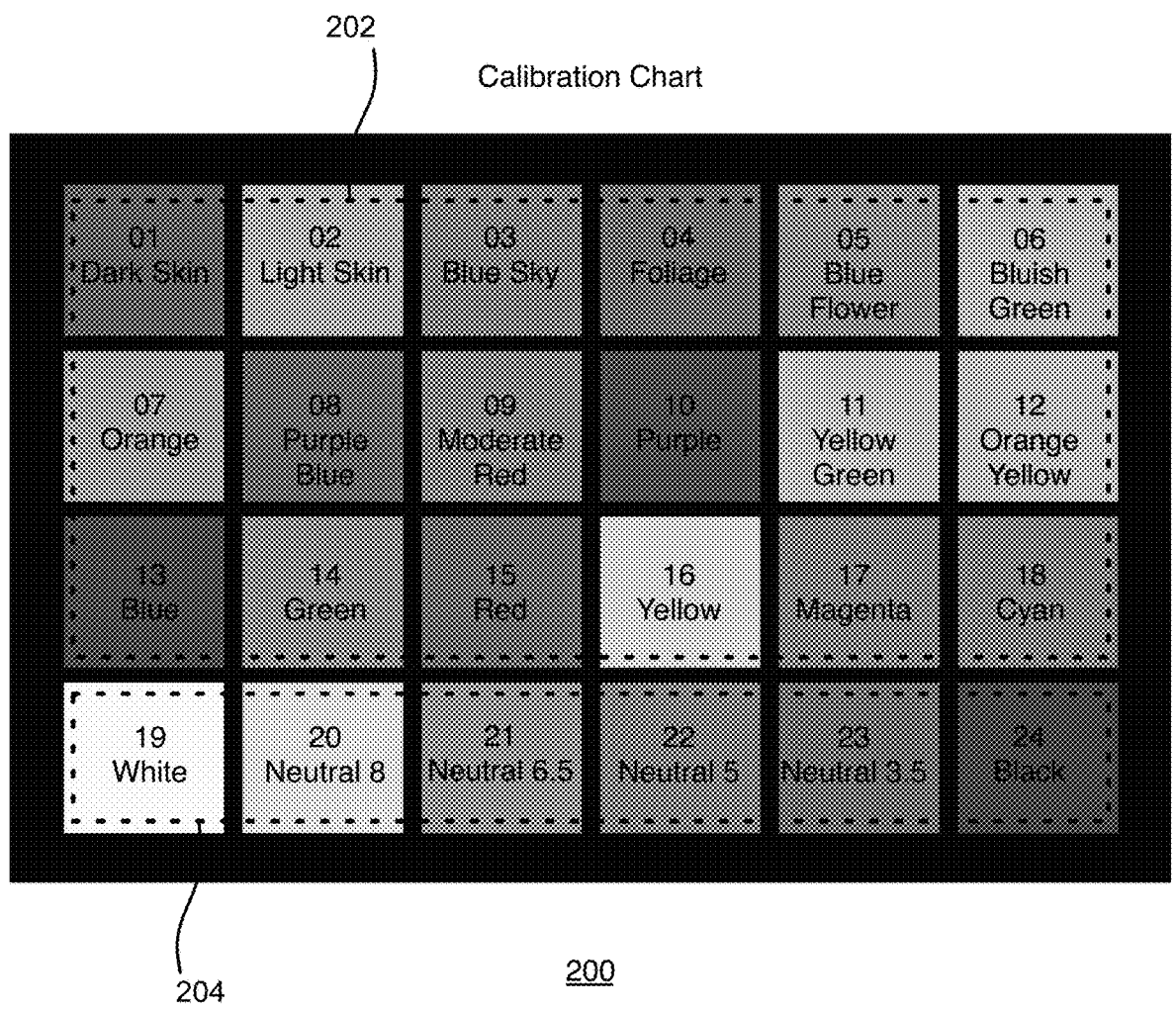
FIG. 2 is an example calibration chart, which may be used for embodiments described herein.

FIG. 2 is an example calibration chart 200, which may be used for embodiments described herein. In various embodiments, calibration chart 200 may be used to implement calibration chart 110 of FIG. 1. In various embodiments, calibration chart 200 may be a Macbeth color checker chart, or other suitable chart used for calibrating image parameters in one or more images. Further embodiments involving calibration chart 200 and/or calibration chart 110 of FIG. 1 are described in more detail herein.

As shown, calibration chart 200 includes two sets of color patches, which include patches 202 and patches 204. Each set of color patches is indicated by dotted lines. In various embodiments, patches 202 are red-blue-green (RGB) patches, and patches 204 are grayscale patches. The terms "color patches" and "patches" may be used interchangeably.

As shown, each patch in the sets of patches is unique in color and indexed with unique numbers. The colors and index number may vary, and will depend on the particular implementation. In this example embodiment, the upper left patch is a chromatic color of dark skin (labeled "Dark Skin") and has an index number of "01." The upper right patch is a chromatic color of bluish green (labeled "Bluish Green") and has an index number of "06." Other example chromatic colored patches are shown in the set of patches 202.

In another example, the lower left patch is a grayscale color white (labeled "White") and has an index number of "19." The lower right patch is a grayscale color black (labeled "Black") and has an index number of "24." Other example grayscale color patches are shown in the set of patches 204. While a total of 24 patches are shown, the particular number of patches may vary, and will depend on the particular implementation.

In various embodiments, patches have a predetermined shape and a predetermined size. In various embodiments, the predetermined shape of each of the patches is square. The predetermined shape of the patches may vary, and will depend on the particular implementation.

In various embodiments, the predetermined size of each of the patches may vary, and will depend on the particular implementation. In various embodiments, the predetermined size is a minimum predetermined pixel number threshold. For example, in various embodiments, the predetermined size may be a predetermined number of pixels in volume (e.g., 4 pixels per patch, 9 pixels per patch, etc.). This predetermined size or number of pixels may be referred to as a predetermined pixel number threshold.

As described in more detail below, in various embodiments, the system analyzes the pixels of each patch to determine a particular color value (e.g., dark skin, light skin, blue sky, etc.) of each patch. In various embodiments, the system requires that the number of pixels in a given patch meets at least the predetermined pixel number threshold in order for the system to adequately read the pixel values and determine the color of the pixels in the given patch.

Figure 3:
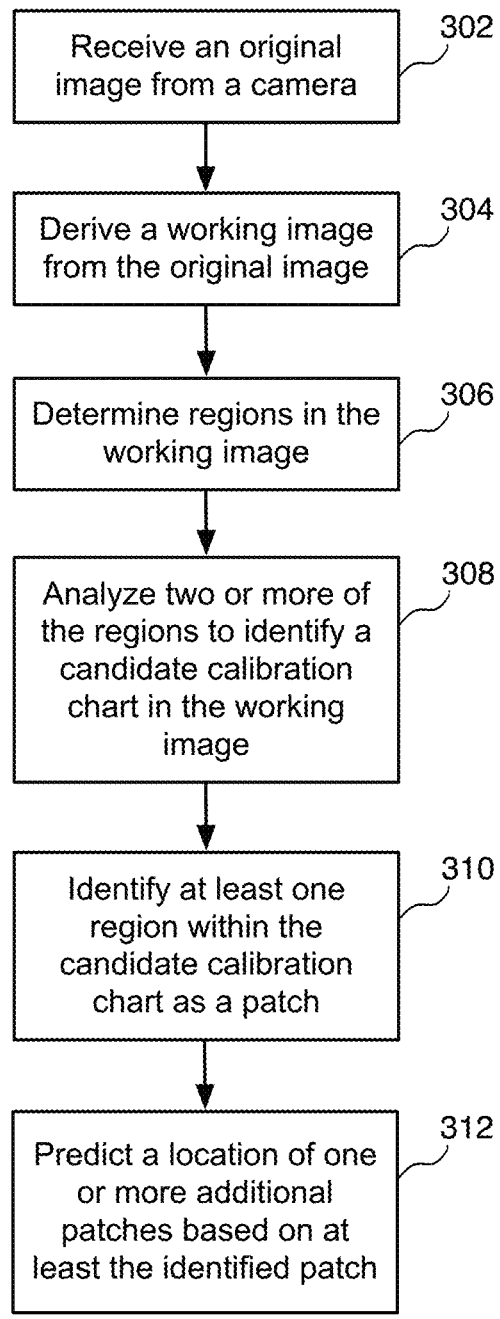
FIG. 3 is an example flow diagram for detection of a calibration object in an image, according to some implementations.

FIG. 3 is an example flow diagram for detection of a calibration object in an image, according to some implementations. As described in more detail below, embodiments identify image calibration data including information in the calibration object, which may be used to correct image parameters of an image. Referring to both FIGS. 1 and 3, a method is initiated at block 302, where a system such as system 102 receives an original image 106 from a camera, where original image 106 includes at least a portion of a calibration chart. In various embodiments, image 106 includes objects, where at least one of the objects is a calibration chart 120, which may be captured completely or partially in image 106. Such images may be taken on location in the film setting and then may later be processed by system 102 or alternatively processed in real time on site. This may be a scenario where system 102 is on site and is communicating with camera 104 in real-time. In various embodiments, image 106 may be referred to as a source image, where the source image is one image (e.g., the first image) of a series of images captured by the same camera.

At block 304, system 102 derives a working image from the original image. For ease of illustration, reference to image 106 of FIG. 1 may refer to the original image and/or to the working image unless otherwise specified. Because different cameras may each have a different color science with inherent variances of image parameters, different cameras may produce images with slightly different color characteristics. For example, a given camera may capture the same objects in a scene as another camera, yet both cameras have different levels of brightness. Such differences may be detectable by the human eye. As such, the brightness or other image parameters need to be calibrated or corrected, which is achieved with the various embodiments described herein.

At block 306, system 102 determines regions in the working image, where each region comprises a group of pixels having values within a predetermined criterion. In various embodiments, a given group of pixels may include one or more sets of pixels, where each set of pixels may contain connected, contiguous, and/or adjacent pixels. In various embodiments, a given pixel of a set of connected pixels may be connected to 4 neighboring pixels, 8 neighboring pixels, etc., depending on the particular implementation. In various embodiments, the predetermined criterion may include color and/or a color range. In some embodiments, system 102 may search for a group of pixels that are within a predetermined distance from each other (e.g., within 1 pixel from each other, within 2 pixels from each other, etc.). The predetermined distance may vary, depending on the particular embodiment. For example, in various embodiments, the predetermined distance may be that the pixels are adjacent to or neighboring each other.

As described in more detail herein, system 102 determines the regions in the image in order to identify calibration chart 110 in image 106. In some embodiments, system 102 divides image 106 into regions 122, 124, 126, and 128, and searches regions 112, 114, 116, and 118 for patches 120 in calibration chart 110. In various scenarios, calibration chart 110 may be positioned within a single region. In other scenarios, calibration chart 110 may be span across multiple regions, where regions and/or portions of regions may be within calibration chart 110 in image 106. In various embodiments, each region is a group of pixels with a particular color, and where the pixels are connected, contiguous, and/or adjacent pixels. As described in more detail herein, system 102 searches for and identifies calibration chart 110 in image 106 based on the identified regions.

At block 308, system 102 analyzes two or more of the regions to identify a candidate calibration chart in working image 106. As described in more detail herein, the patches have a predetermined shape and a predetermined size. As described in more detail herein, in some embodiments, system 102 checks the shape of each region. In various embodiments, system 102 may filter one or more portions of one or more regions based on shape. System 102 may filter or eliminate one or more portions of one or more regions and/or objects as potential or candidate patches 120 based on a predetermined shape. For example, of a portion of a region or an object is expected to be square or rectangular but system 102 determines it to be circular, system 102 may eliminate the region portion or object as a potential patch. As described in more detail herein, in some embodiments, system 102 checks the size of each region. Also, in some embodiments, the system may also eliminate one or portions of regions and/or more objects as potential or candidate patches 120 based on a predetermined size. Various example embodiments directed to identifying calibration chart 110 and involving shape and size rejection are described in more detail below.

At block 310, system 102 identifies at least one region within the candidate calibration chart as a patch. In some embodiments, the system determines a position of calibration chart 110 in image 106 based on the regions and based on the identified patches. As described in more detail herein, system 102 determines that various position information associated with calibration chart 110 may include fit and orientation of calibration chart 110 in image 106. Various example embodiments directed to identifying patches 120 in calibration chart 110 are described in more detail below.

In various embodiments, system 122 may determine one or more colors from patches 120. In various embodiments, such colors may include chromatic colors and grayscale colors. Various example embodiments directed to determining colors of patches 120 in calibration chart 110 are described in more detail below.

At block 312, system 102 predicts a location of one or more additional patches based on at least the identified patches. For example, after identifying at least one patch, system 102 may then analyze other regions in image 106 to identify other patches in a similar manner. In various embodiments, the contents of calibration chart 110 is known or predetermined. As such, system 102 computes or ascertains the location of identified patches captured in image 106.

In various embodiments, in response to the one or more colors of the patches 102, system 102 determines at least one correction to at least one image parameter associated with image 106 based on patches 120 in calibration chart 110 as further described below with reference to FIG. 4. For example, referring to FIGS. 1 and 2, system 102 may identify a patch of chart 120 as "21 Neutral 6.5" and utilize a reference RGB value of patch "21 Neutral 6.5" to determine the correction value to apply to RGB used to generate image 110 in order to change the determined value of "21 Neutral 6.5" in image 110 to within a tolerance of the reference RGB value. In various embodiments, system 102 may determine a multiplier to calibrate or correct the image parameter of image 106. System 122 may then apply the multiplier to all images of a series of images of a particular video footage.

In various embodiments, system 102 generates one or more image parameters, where one of the image parameters may include a brightness parameter. In various embodiments, system 102 generates one or more image parameters, where one of the image parameters may include a exposure parameter. The particular image parameter that system 122 adjusts and the number of image parameters that system 122 adjusts may vary and will depend on the particular implementation. For example, in various embodiments, system 102 generates one or more image parameters, where one of the image parameters may include a white balance parameter. In other embodiments, the image parameter may be hue. Various example embodiments directed to determining one or more corrections to one or more image parameters are described in more detail below.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
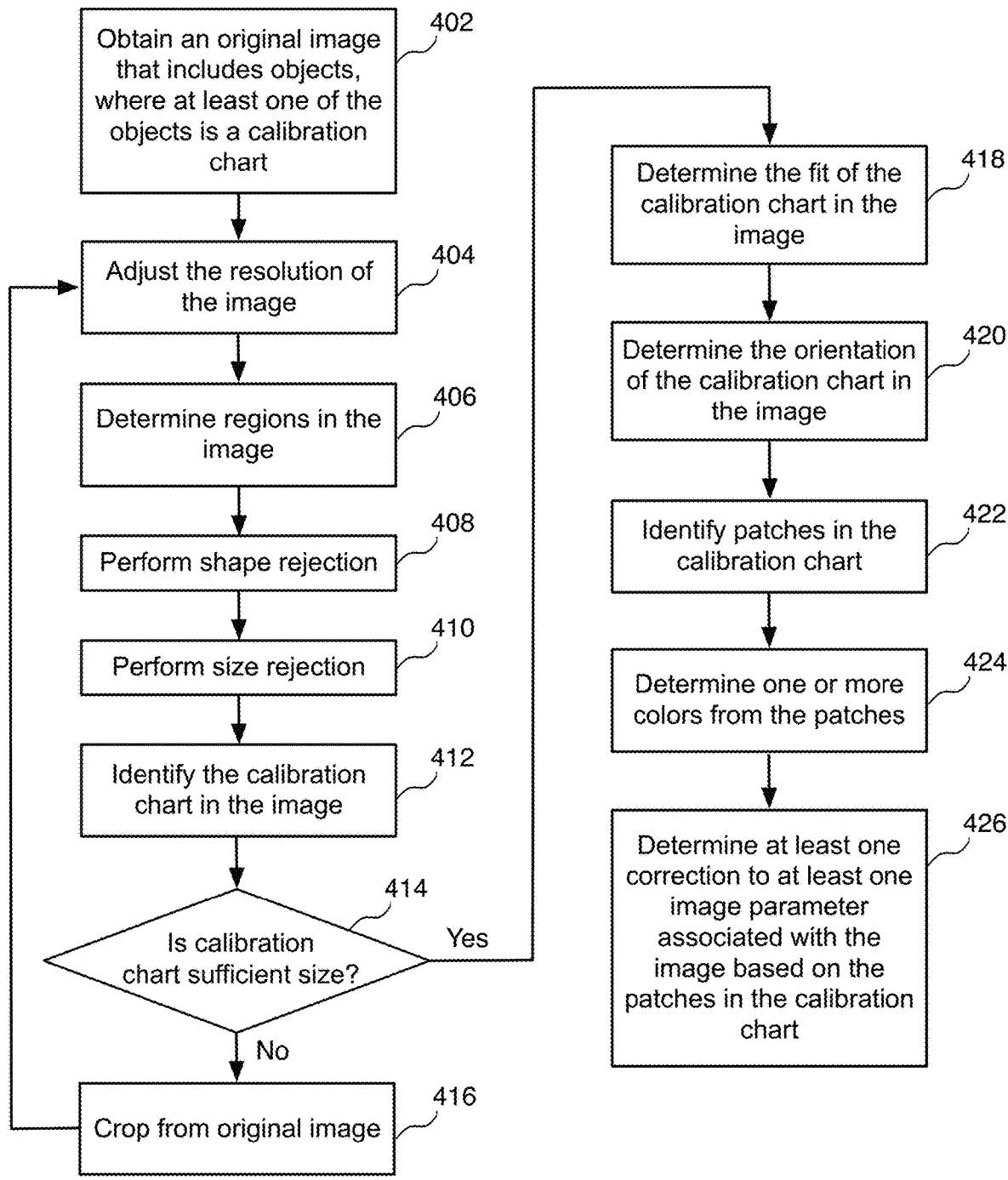
FIG. 4 is an example flow diagram for detection of a calibration object in an image, according to some implementations.

FIG. 4 is an example flow diagram for detection of a calibration object in an image, according to some implementations. Referring to both FIGS. 1 and 4, a method is initiated at block 402, where a system such as system 102 obtains image 106. In various embodiments, image 106 includes objects, where at least one of the objects is calibration chart 110. As indicated above, in various embodiments, image 106 may be referred to as a source image, where the source image is at least one image (e.g., the first image) of a series of images captured by same camera 104. As described in more detail below, the system may then make the correction to the image parameter source image and then apply the same correction to the other images of the sequence. Applying the same adjustment for all images of the series will have correct results. Because the images of the series are captured by the same camera, any correction will fix any variance of an image parameter such as brightness caused by the camera.

At block 404, system 102 adjusts the resolution of image 106. In some embodiments, the system may adjust (e.g., reduce) the resolution of image 106 downward in order to increase the processing speed and reduce needed computation resources.

At block 406, system 102 determines regions 112, 114, 116, and 118 in image 106. In some embodiments, the system divides image 106 into regions 112, 114, 116, and 118. The number of regions that the system determines or delineates in image 106 may vary, and the particular number of regions will depend on the particular implementation. As described in more detail herein, in various embodiments, the system searches on or more of regions 112, 114, 116, and 118 for patches 120 in calibration chart 110. As described in more detail herein, in various embodiments, system 102 determines a position of calibration chart 110 in image 106 and its associated patches 120 based on the regions.

Note that the determining of regions 112, 114, 116, and 118 is described above in connection with FIG. 2 in the context of the system identifying calibration chart 110 in image 106. In various embodiments, the step of determining regions may be performed before and/or as a part of the system identifying calibration chart 110. In some embodiments, the step of block 406 may be optional.

In some embodiments, system 102 may utilize a region-merging algorithm to group together pixels that have the same color. The system does not make assumptions about the color of the patches of calibration chart 110 in image 106, but rather reads the actual image parameter values from the pixels in image 106. As described in more detail herein, the system compares these actual, read image parameter values to predetermined correct or desired image parameter values in order to determine appropriate corrections. For example, the system may correct a patch that is gray but that is not sufficiently bright by applying a multiplier to increase the brightness to the desired brightness value. The correction will correct all other pixels of the same gray color in the region in the same corrective manner.

The step of block 406 is beneficial in that it enables system 122 to more accurately and robustly identify calibration chart 110. For example, by dividing or delineating image 106 into regions, system 122 systematically searches for and identifies calibration chart 110, and its associated patches 120, region by region. In various embodiments, once calibration chart 110 and its associated patches 120 are found and identified, system 122 may stop analyzing image 106, unless system 122 needs to search for and find a second calibration chart and associated patches. By being able to analyze portions of image 106 instead of potentially having to analyze entire image 106, system 102 consumes fewer computer resources. This also saves computation time by not needing to take extra time to further process regions that might not contain a calibration chart 110. Furthermore, analyzing image 106 region-by-region enables system 122 to search and identify calibration chart 110 and its associated patches 120 faster by potentially eliminating unnecessary processing of objects on at least some regions.

At block 408, system 102 performs shape rejection. As indicated above, the patches of calibration chart 110 have a predetermined shape. In various embodiments, system 122 may eliminate one or more objects as patches 120 based on the predetermined shape. In other words, the different objects captured in image 106 are candidate objects, where system 122 determines which objects of the candidate objects are patches of calibration chart 110. As system 122 passes through regions of image 106, system 122 compares each object to the predetermined shape and rejects or eliminates candidate objects that do not match the predetermined shape. For example, in various embodiments, the predetermined shape is a square. As such, system 122 will reject a rounded, oblong object as a patch. In some embodiments, the system 122 may compensate for angle and perspective in searching for objects that may vary in shape relative to their angle to an image plane of camera 104, such as squares. In some embodiments, system 102 may analyze the aspect ratio of each object. The system may reject or eliminate candidate objects where the height and width are not equal. In this example, non-square objects (e.g., a person, cylindrical barrel, etc.) would not be patches. Conversely, the system may identify candidate objects as potential patches if such candidate objects have equal height and width.

In some scenarios, a particular patch may be split into two portions due to shadows, noise, dirt, etc. In some embodiments, the system may determine that two portions are a part of the same patch based on the color read from each of the patch portions.

At block 410, system 102 performs size rejection. As indicated above, the patches of calibration chart 110 have a predetermined size. In various embodiments, the system may eliminate one or more candidate objects as patches based on the predetermined size. As the system passes through regions of image 106, the system measures each object and rejects or eliminates candidate objects that are smaller than the predetermined size. As indicated above, for example, in various embodiments, the predetermined size may be a predetermined number of pixels in volume (e.g., 4 pixels, 9 pixels, etc.). This predetermined number of pixels may also be referred to as a predetermined pixel number threshold. In some embodiments, system 102 may analyze the number of pixels of each object. System 102 may reject or eliminate candidate objects where the number of pixels falls below the predetermined pixel number threshold. In this example, objects that are too small (e.g., under 4 pixels) would be rejected as patches. Even if such objects were indeed patches, the system may determine that the patches may be too small for analysis. For example, a given calibration chart 110 may be located too far back in the background of the image, and would be too small. If a patch is too small, system 102 might not appropriately or accurately read and determine color information from the patch. As such, system 102 might not recognize the object as a patch 120. Conversely, system 102 may identify candidate objects as potential patches 120 if such candidate objects meet or exceed the predetermined pixel number threshold.

In various embodiments, system 102 may utilize suitable pattern recognition techniques to recognize and identify candidate objects as patches for such objects that meet both the predetermined shape and predetermined size requirements. In some embodiments, system 122 may recognize and identify candidate objects as patches for such objects that meet at least one of the predetermined shape and predetermined size requirements.

As indicated herein, system 102 searches for a complete set of patches (e.g., 18 chromatic patches, 6 grayscale, etc.) or the most complete set of patches. In various embodiments, system 122 need only find a subset of the total number of patches order to identify calibration chart 110. For example, if a patch is black and the background is dark or otherwise obscured, system 102 might not find that particular black patch. In some embodiments, system 102 may search of a portion (e.g., 4, 5, or 6 patches) of a row. As long as one patch is identified, system 102 will ascertain the location of calibration chart 110.

In various embodiments, system 102 computes the orientation of the candidate calibration chart. If more than one patch is identified, it increases the robustness of system 102 ascertaining the location of calibration chart 110, as well as its orientation. As such, the system 102 may identify only a portion of all patches 120 of given calibration chart 110. Embodiments described herein may still operate successfully based on the patches that are identified, depending on the particular implementation. For example, one or more patches 120 may be obscured by another object, or visual "noise", or a shadow, etc. As such, system 102 might not identify all patches 120 of a given calibration chart 110. In various embodiments, as long as system 102 identifies certain patches 120, the system 102 may still read the colors of the identified patches 120 and still perform the various steps to correct one or more image parameters of image 106.

Note that while the performance of shape rejection and size rejection is described above in connection with FIG. 2 in the context of system 102 identifying calibration chart 110 in image 106, in various embodiments, the steps of shape rejection and size rejection may be performed before and/or as a part of the system identifying calibration chart 110. In some embodiments, the steps of blocks 408 and 410 are optional, where the system may utilize both, either one of, or none of the steps of blocks 408 and 410.

The steps of block 408 and/or block 410 are beneficial in that they enable system 102 to more accurately and robustly identify calibration chart 110 by eliminating false positives (e.g., eliminating a non-patch object from candidate patch objects. For example, by eliminating all or at least some objects in image 106 (e.g., objects 108, 112, 114, 116, etc.) as candidate objects to be determined as patches of calibration chart 110, system 102 consumes fewer computer resources by avoiding further analysis on such objects. This also saves computation time by not needing to take extra time to further process non-patch objects. Furthermore, the process of eliminating non-patch objects from candidate objects enables system 102 to search and identify actual patches of calibration chart 110 faster by eliminating unnecessary processing of the non-patch objects. Furthermore, the process of eliminating non-patch objects from candidate objects enables system 102 to more accurately identify patches of calibration chart 110.

At block 412, system 102 identifies calibration chart 110 in the image. In various embodiments, system 102 identifies the calibration chart in the image based at least in part on the system's performing of shape rejection and size rejection. System 102 finds and identifies patches 120 based on shape and size of patches 120, and system 102 eliminates non-patch objects based on shape and size of those objects. By identifying patches 120, system 102 identifies calibration chart 110, which contains patches 120.

At block 414, system 102 determines if calibration chart 110 is of a sufficient size. If yes, system 102 continues to block 418, described below. If no, system 102 continues to block 416, described below. The calibration chart might not be of a sufficient size in a scenario, for example, where calibration chart 110 is small in the image (e.g., far away).

At block 416, system 102 crops calibration chart 110 from the original image 106. After cropping calibration chart 110, system 102 returns to block 404, described above.

At block 418, system 102 determines the fit of calibration chart 110 in image 106. As indicated above, in various embodiments, system 102 determines a position of calibration chart 110 in image 106 and its associated patches 120 based on the regions. One aspect of the position is the fit of calibration chart 110, and another aspect of the position is the orientation of calibration chart 110, which is described below in connection with block 416.

With regard to the fit of calibration chart 110, in various embodiments, system 102 determines the coordinates of calibration chart 110. For example, system 102 may determine that the upper left corner of calibration chart 110 is at a coordinate at 0,0, the upper right is at 1,0, the lower left is at 0,1, and the lower right is at 1,1. System 102 may then perform a mathematical transform to convert the calibration chart space coordinates to pixel coordinates. As noted herein, patches 120 of calibration chart 110 are located in predetermined positions of calibration chart 110. As such, once system 102 determines the corners of chart 110, system 102 ascertains the locations of patches 120 in the image. Furthermore, because system 102 knows the geometry of calibration chart 110 and its patches 120, system 102 ascertains a location, such as the center, of each given patch 120 for reading image parameters such as brightness, etc.

At block 420, system 102 determines the orientation of calibration chart 110 in image 106. In various embodiments, system 102 determines the orientation of calibration chart 110 based on determining the relative coordinates of at least 2 patches. Any 2 identified patches in image 106 may inform the orientation of calibration chart 110. For example, the relative positioning of the 24 patches of calibration chart 110 is known. As such, if the system determines that an upper left patch is "Dark Skin 01" and the lower right patch is "Black 24," system 102 may ascertain that calibration chart 110 is right side up. Conversely, if the system determines that an upper left patch is "Black 24" and the lower right patch is "Dark Skin 01," system 102 may ascertain that calibration chart 110 is upside down. Every addition patch 120 that is identified incrementally improves the accuracy and robustness of identifying the orientation of calibration chart 110.

Note that while the determining of the fit and orientation of calibration chart 110 is described above in connection with FIG. 2 in the context of the system identifying patches of calibration chart 110, in various embodiments, the steps of determining the fit and the orientation may be performed before and/or as a part of system 102 identifying the patches of calibration chart 110. In some embodiments, the steps of blocks 418 and 420 are optional, where system 102 may utilize both or either one of or none of the steps of blocks 418 and 420.

The steps of block 418 and/or block 420 are beneficial in that they enable system 102 to more accurately and robustly identify individual patches 120 of calibration chart 110. For example, by determining the fit and orientation of calibration chart 110, once system 102 determines one or more patches 120 and knows the color information from those patches, system 102 may quickly identify the rest of patches 120 in calibration chart 110, which may save computation resources and computation time.

At block 422, system 102 identifies patches 120 in the calibration chart 110. In various embodiments, system 102 may utilize any suitable pattern recognition techniques to identify the patches based on shape and size. System 102 improves the robustness of identifying patches by eliminating the non-patch objects based on shape and size rejection techniques. In some embodiments, when patch 120 is identified, the system may enable the patch to indicate vote as to the configuration of chart 110, similar to a Hough transform.

At block 424, system 102 determines one or more colors from patches 120. In various embodiments, system 102 computes or ascertains the orientation of the calibration chart based on the determined colors from patches 120. By knowing the calibration chart orientation and knowing the approximate centers or other location within patches 120, system 102 may then read the RGB pixel values in each patch of the image to determine the colors. System 102 may also read other image parameters such as brightness during the reading process. In various embodiments, system 102 may increase the image resolution for color extraction. In various embodiments, there may be various reasons to locate a chart and to extract recorded red-blue-green (RBG) values for each patch. For example, a reason may be to find adjustments to camera settings or post-processing to produce the required image.

At block 426, system 102 determines at least one correction to at least one image parameter associated with the image based on the patches in calibration chart 110. In various embodiments, system 102 extracts pixel colors from patches 120 of chart 110. System 102 then compares each read or actual pixel value to a target or reference pixel value to determine a difference. The reference pixel value may be derived from a reference calibration chart. Patches 120 should be identical, or within a tolerance, in color and brightness relative to a reference chart value. In various embodiments, the difference may become an offset value or correction value. In various embodiments, the output (e.g., correction value) may be stored in a spreadsheet, data structure, or other suitable file for further processing.

As indicated above, there may be various reasons to locate a chart and to extract recorded RGB values for each patch. In another example, a reason may be for system 102 to process the recorded RGB values for one or more cameras and/or any digital post-processing any system to perform. In this scenario, in some embodiments, instead of performing the step of block 426, system 102 may compute and record average RGB color values and/or other statistics for all patches to be processed and/or analyzed by some other system.

As indicated above, in various embodiments, system 102 may determine a multiplier to calibrate or correct the image parameter of image 106. More specifically, a calibration or correction to an image parameter means system 102 adjusts an actual image parameter value to a correct or desired image parameter value. For example, in some embodiments, the system may apply the multiplier to the brightness value of each of the RBG channels. The system may then apply the multiplier to the brightness value of all images of a series of images of a particular video footage captured by same camera 104. With such adjustments, patches 120 on calibration chart 110 will have the correct or desired chromatic and/or grey scale brightness value and/or other correct image parameter value(s). As indicated above, system 102 may apply any correction to the source image to other images captured by the same camera to get similar or substantially the same results such as appropriate brightness or other image parameters (e.g., exposure, etc.). In various embodiments, system 102 may use any corrections to discover information about a given camera, where such information may be unknown. In some embodiments, system 102 may use such outputs or corrections for correcting camera settings.

In some embodiments, the image parameter is brightness. In some embodiments, the image parameter is exposure. The particular image parameter that system 102 adjusts and the number of image parameters that system 102 adjusts may vary and will depend on the particular implementation. Various example embodiments directed to determining one or more corrections to one or more image parameters are described in more detail below.

In various embodiments, system 102 outputs all relevant information associated with calibration chart 110. For example, system 102 may output the read image parameters (e.g., RGB color values, brightness, hues, saturation, white balance, etc.) and corresponding index number for each identified patch of calibration chart 110.

In various embodiments, the correction information may be used to calibrate particular camera 104, adjusting its image parameter settings for future shoots. For example, if a series of images is overexposed, patches 120 will have the same brightness. Camera 104 and possibly other cameras may be calibrated with appropriate image parameter settings. The particular adjustments or corrections may depend on the ambient lighting conditions (e.g., bright light, dark light, etc.). In some embodiments, a source image that includes calibration chart 110 may be replaced with a diagnostic image for further troubleshooting and refinement of the image parameters. In some embodiments, system 102 may utilize images having the same calibration chart 110, yet from multiple different cameras. This may be useful to align the image parameters associated with the different cameras so that their produced images look the same.

In various embodiments, system 102 may handle various failure modes. For example, it may be difficult to identify calibration chart 110 in an image that also includes a chain link fence. In various embodiments, system 110 may look at relative brightness or colors to reject. The system may gather all of the possible candidate positions of the calibration chart and then filter the positions by looking for the patches with the greatest brightness/color variation that would be consistent with calibration chart 110 being searched for. In some embodiments, system 102 may crop the image 106 down in order to reduce any potential search error. System 102 may use any information derived from the read patches to determine the correction multiplier (e.g., RGB multiplier). System 102 then adjusts the RGB values based on the correction multiplier and then determines how far off patches 120 are once they have been corrected. In another failure scenario, a given patch 120 might have the wrong brightness, which may inform system 102 that a shot has been shot badly, e.g., overexposed, etc.

In various embodiments, system 102 may perform the following method to facilitate an image adjustment. System 102 receives an original image from the camera, where the original image includes at least a portion of a calibration chart. System 102 derives a working image from the original image. In some embodiments, the original image becomes a working image after the resolution of the original image is adjusted. For example, in some embodiments, system 102 may decrease the resolution. In some embodiments, system 102 may increase the resolution.

In various embodiments, system 102 determines regions in the working image, where each region comprises a group of pixels having values within and/or that meet a predetermined criterion. In some embodiments, determining regions based on shape includes checking an aspect ratio of a region. In some embodiments, determining regions based on shape includes checking a size of a region. In some embodiments, before system 102 identifies at least one region, system 102 may determining that the candidate calibration chart is at least a predetermined number of pixels in size. Otherwise, in some embodiments, system 102 may crop the original image to a smaller area that includes the candidate calibration chart. System 102 may then return to the act of adjusting the resolution of the image while using the cropped original image as the original image.

In various embodiments, system 102 matches at least a portion of the candidate calibration chart in the working image to a predetermined template. In various embodiments, the system adjusts an orientation of the candidate calibration chart prior to the matching. For example, system 102 may determine whether the candidate calibration chart in the image is right side up, upside down, sideways, etc. based on the known, predetermined calibration chart. For example, the system may compare the colors of the identified patches in the candidate calibration chart to the colors of the known, predetermined calibration chart.

In some embodiments, the matching is performed with at least a portion of the predetermined template. In some embodiments, regions are not matched if a spacing of the regions is above a predetermined maximum relative distance. In some embodiments, regions are not matched if a spacing of the regions is below a predetermined minimum relative distance. In some embodiments, regions are not matched if a density of the regions is above a predetermined maximum density. In some embodiments, regions are not matched if a density of the regions is below a predetermined maximum density.

In various embodiments, system 102 may determine a confidence score (e.g., 90%, 97%, etc.) that a match is found. In some embodiments, system 102 may iterate to improve the confidence score until a sufficient match is found. System 102 may alert a predetermined person if no sufficient match is found (e.g., a match with a confidence score that is above a predetermined threshold). In some embodiments, system 102 may determine a failure to match a fit of the calibration chart in the working image to the chart template. System 102 displays at least a portion of the working image on a display device. System 102 accepts a signal from a user input device to select a subset of the working image. In some embodiments, system 102 may repeat one or more of the acts described herein using the selected subset of the working image.

In various embodiments, system 102 filters at least a portion of the determined regions based on shape. In some embodiments, the filtering at least a portion of the regions based on shape includes checking for rectangularity of a region. In various embodiments, system 102 may filter portions of regions based on various information including shape (e.g., rectangularity, etc.), a number of pixels in a predetermined color range, aspect ratios of patches, etc. System 102 uses two or more of the regions to identify a candidate calibration chart in the working image. System 102 identifies at least one region within the candidate calibration chart as a patch.

In various embodiments, system 102 predicts the location of one or more additional patches based on at least the identified patch. In some embodiments, predicting includes using geometric extrapolation to predict patch locations from one or more identified patch locations. In some embodiments, system 102 uses geometric interpolation to predict patch locations from one or more identified patch locations.

In various embodiments, system 102 computes image data based on at least one pixel value from the identified patch. In various embodiments, the computed image data may include image adjustment parameters. For example, in various embodiments, system 102 uses at least one pixel value from the predicted patch to provide image adjustment parameters. The particular types of image data may vary, depending on the particular implementations. For example, in some embodiments, the image data may include camera sensor profile.

In various embodiments, system 102 computes image data based on one or more pixel values from the identified patch. In various embodiments, system 102 may obtain the one or more pixel value from a middle area of the identified patch in the calibration chart to compute the image data, including one or more image parameters. System 102 may obtain pixel values from the middle area of identified patches in order to read as many pixels of the same color as possible. Pixels from the middle area of a given patch are preferred over pixels at the edge of the given patch, because pixels at the edge may have shadows, for example.

In some embodiments, the image parameter may include a white balance parameter. In some embodiments, the image parameter may include an exposure parameter.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In various embodiments, system 102 may perform the following method to facilitate a camera adjustment. In some embodiments, system 102 receives an original image from the camera, wherein the original image includes at least a portion of a calibration chart. System 102 adjusts a resolution of the original image to create a working image. System 102 determines regions in the working image, wherein each region comprises a group of pixels having values within and/or that meet a predetermined criterion. System 102 filters at least a portion of the determined regions based on shape. System 102 uses two or more of the regions to identify a candidate calibration chart in the working image. System 102 determines that the candidate calibration chart is at least a predetermined number of pixels in size, else cropping the original image to a smaller area that includes the candidate calibration chart, then returning to the act of "adjusting a resolution," above, while using the cropped original image as the original image. System 102 matches at least a portion of the candidate calibration chart in the working image to a predetermined template. System 102 identifies at least one region within the candidate calibration chart as a predetermined patch. System 102 uses at least one pixel value from the predetermined patch to provide an imaging parameter for adjusting the camera.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following are additional embodiments that may be used in combination with other embodiments described herein. The 'downres, process, crop, reprocess' technique is kind of an 'optional extra' rather than the core of the invention. Its main purpose is to make working it possible to work quickly at low resolution without too much danger of losing quality.

For clarification, the regions are blocks of pixels that could be color chips on the chart. For example, in a "perfect" image of the 6×4 Macbeth Chart on a black background, the system may find exactly 24 regions.

The "determining region" step might find parts of the image, which are not chips of the chart (false positives) or might fail to identify a region for one of the chips on the chart (false negatives).

The point of the "matching" step is to work out which regions in the image correspond to chips on the chart, and working out which region is which chip. This makes it robust to false positives.

Having worked out that correspondence, it is possible to deduce the position of all the chips in the chart, a matrix that maps between a 2D coordinate on the surface of the chart, and a 2D pixel position.

That relationship holds well enough to predict the center of the chips, as long as the chart has not been bent, there is not too much lens distortion, and at least four regions have been identified.

This makes the matching robust to false negatives. Even though a region was not identified over a given chip, its position may be inferred from other regions that were identified.

In some embodiments, there may also be a "validation" step. For example, once the values have been extracted, and values found to balance the chart, the values are checked. The error measure between what the corrected values of each patch are versus the expected value also tests for "non-monotonic" values. In some embodiments, there may be six grey patches of increasing brightness from nearly black to nearly white. If the image doesn't also have that same progression from low to high values, then either the chart was not found correctly. Otherwise, there would be something wrong with the picture that makes it unreliable. This validation is separate from the "failure to locate chart." System 102 may reliably find 24 regions that perfectly fit the shape of the chart, but the pixel values do not correspond to those that the chart should have. It might be the wrong sort of chart, or there could be a shadow on one of the patches.

In some embodiments, system 102 may use values that the camera captured for each of the chips and known theoretical values to perform white balance, exposure correction, determination of dynamic range, linearity of sensor (gamma determination), match one camera to another, etc. In various embodiments, system 102 locates a chart automatically under fairly robust conditions, reliably report when something has gone wrong.

Embodiments described herein provide various benefits. For example, embodiments automatically, without user intervention, correct or calibrate one or more image parameters (e.g., brightness, exposure, hue, etc.).

Figure 5:
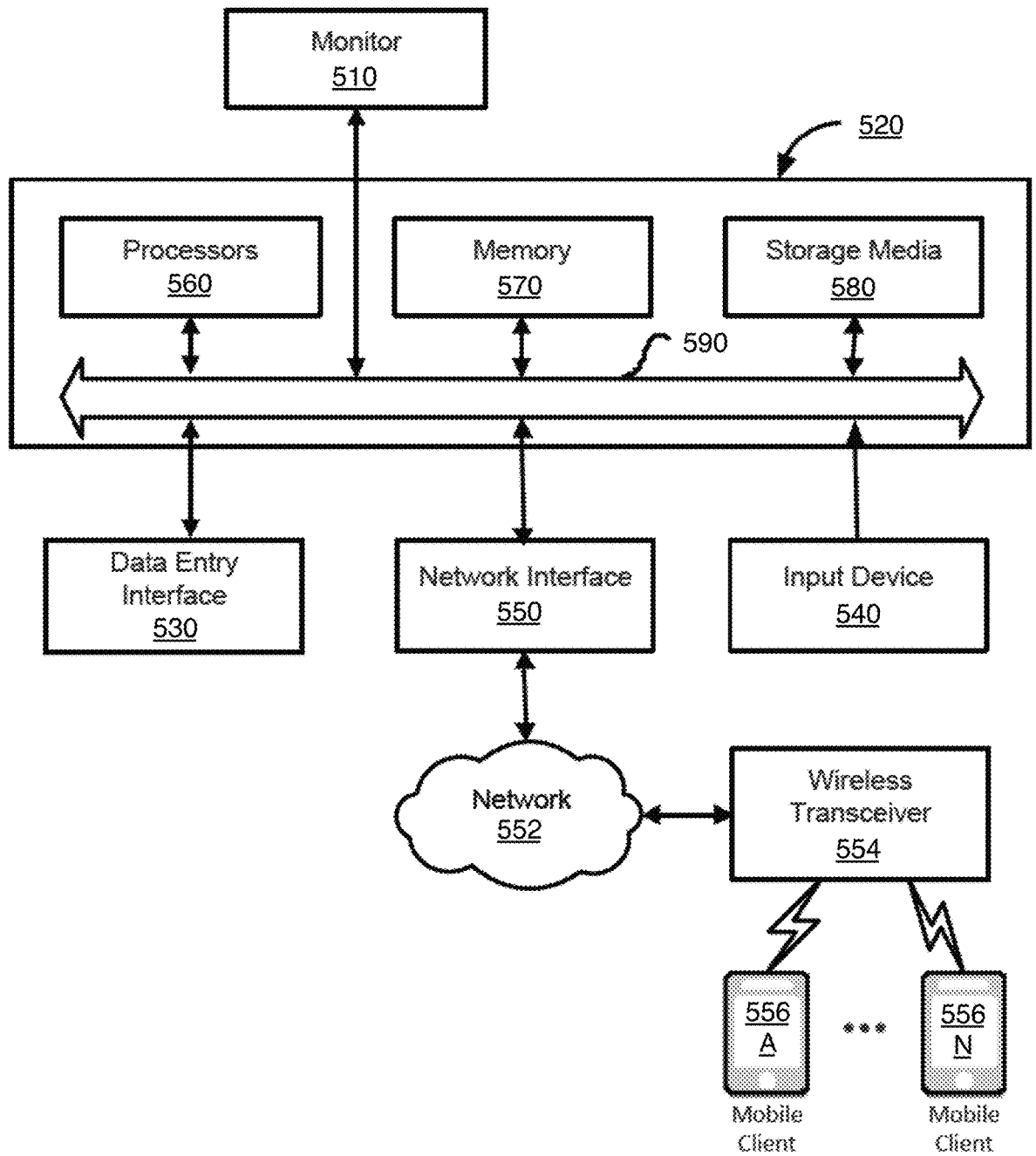
FIG. 5 shows basic components of an example computer system suitable for use with embodiments described herein.

FIG. 5 is a block diagram of an exemplary computer system 500 for use with implementations described herein. Computer system 500 is merely illustrative and not intended to limit the scope of the claims. One of ordinary skill in the art would recognize other variations, modifications, and alternatives. For example, computer system 500 may be implemented in a distributed client-server configuration having one or more client devices in communication with one or more server systems.

In one exemplary implementation, computer system 500 includes a display device such as a monitor 510, computer 520, a data entry interface 530 such as a keyboard, touch device, and the like, a user input device 540, a network communication interface 550, and the like. User input device 540 is typically embodied as a computer mouse, a trackball, a track pad, wireless remote, tablet, touch screen, and the like. Moreover, user input device 540 typically allows a user to select and operate objects, icons, text, characters, and the like that appear, for example, on the monitor 510.

Network interface 550 typically includes an Ethernet card, a modem (telephone, satellite, cable, ISDN), (asynchronous) digital subscriber line (DSL) unit, and the like. Further, network interface 550 may be physically integrated on the motherboard of computer 520, may be a software program, such as soft DSL, or the like.

Computer system 500 may also include software that enables communications over communication network 552 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 552 may include a local area network, a wide area network, a wireless network, an Intranet, the Internet, a private network, a public network, a switched network, or any other suitable communication network, such as for example Cloud networks. Communication network 552 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 552 may communicate to one or more mobile wireless devices 556A-N, such as mobile phones, tablets, and the like, via a base station such as wireless transceiver 554.

Computer 520 typically includes familiar computer components such as a processor 560, and memory storage devices, such as a memory 570, e.g., random access memory (RAM), storage media 580, and system bus 590 interconnecting the above components. In one embodiment, computer 520 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 570 and Storage media 580 are examples of tangible non-transitory computer-readable media for storage of data (or computer-readable storage media), audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, Cloud storage, and the like.

Figure 6:
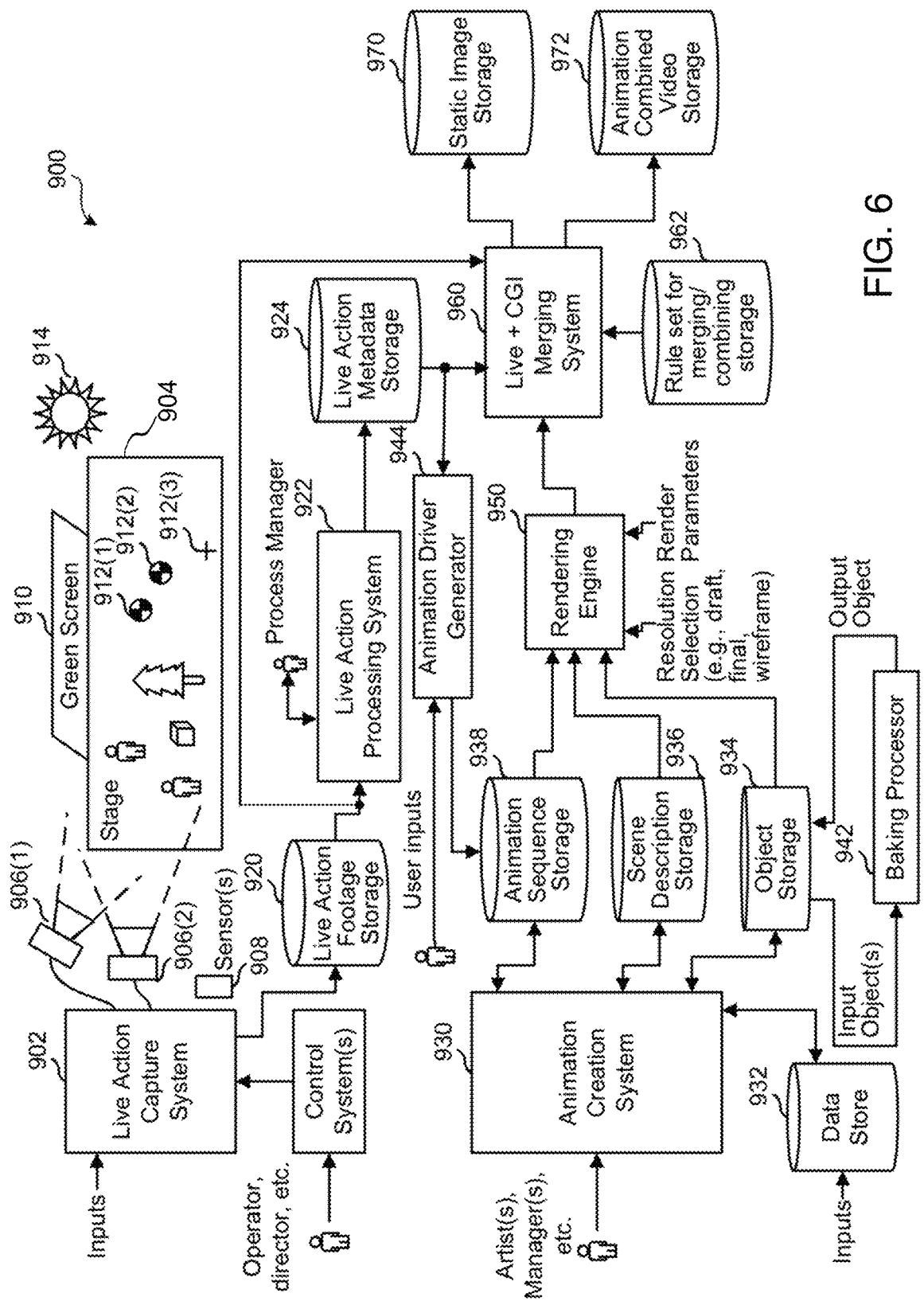
FIG. 6 is a block diagram of an example visual content generation system, which may be used to generate imagery in the form of still images and/or video sequences of images, according to some embodiments.

FIG. 6 is a block diagram of an example visual content generation system 900, which may be used to generate imagery in the form of still images and/or video sequences of images, according to some embodiments. The visual content generation system 900 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images may be represented by a pair of stereo images for three-dimensional presentations and in other variations. Some or all of an image output may represent three-dimensional imagery instead of just two-dimensional views.

A stored video sequence might include a plurality of images such as the still images described above, but where each image of the plurality of images has a place in a timing sequence, and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 80 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, might specify positions of objects and/or lighting, as well as a camera viewpoint, and a camera view plane. Taking all of those as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated. In the example, a ray defined by the camera viewpoint in the scene space and a given pixel in that grid first intersects a solid, opaque, blue object, that a given pixel is assigned the color blue. Of course, for modern computer-generated imagery, determining pixel colors, and thereby generating imagery, can be more complicated, as there are lighting issues, reflections, interpolations, and other considerations.

In various embodiments, a live action capture system 902 captures a live scene that plays out on a stage 904. The live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On the stage 904, there might be human actors, animal actors, inanimate objects, background objects, and possibly an object such as a green screen 910 that is designed to be captured in a live scene recording in such a way that it is easily overlaid with computer-generated imagery. The stage 904 might also contain objects that serve as fiducials, such as fiducials 912(1)-(3), that might be used post-capture to determine where an object was during capture. A live action scene may be illuminated by one or more lights, such as an overhead light 914.

During or following the capture of a live action scene, the live action capture system 902 might output live action footage to a live action footage storage 920. A live action processing system 922 might process live action footage to generate data about that live action footage and store that data into a live action metadata storage 924. The live action processing system 922 might include computer processing capabilities, image processing capabilities, one or more processors, program code storage for storing program instructions executable by the one or more processors, as well as user input devices and user output devices, not all of which are shown. The live action processing system 922 might process live action footage to determine boundaries of objects in a frame or multiple frames, determine locations of objects in a live action scene, where a camera was relative to some action, distances between moving objects and fiducials, etc. Where elements are detected by sensor or other means, the metadata might include location, color, and intensity of the overhead light 914, as that might be useful in post-processing to match computer-generated lighting on objects that are computer-generated and overlaid on the live action footage. The live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of the visual content generation system 900. The animation creation system 930 might include computer processing capabilities, image processing capabilities, one or more processors, program code storage for storing program instructions executable by the one or more processors, as well as user input devices and user output devices, not all of which are shown. The animation creation system 930 may be used by animation artists, managers, and others to specify details, perhaps programmatically and/or interactively, of imagery to be generated. From user input and data from a database or other data source, indicated as a data store 932, the animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 930 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 932 might be used to drive object presentation. For example, if an artist is creating an animation of a spaceship passing over the surface of the Earth, instead of manually drawing or specifying a coastline, the artist might specify that the animation creation system 930 is to read data from the data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene, and generate corresponding animation parameters to be stored in the animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 922. The animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. The rendering engine 950 might include computer processing capabilities, image processing capabilities, one or more processors, program code storage for storing program instructions executable by the one or more processors, as well as user input devices and user output devices, not all of which are shown.

The visual content generation system 900 can also include a merging system 960 (labeled "Live+CGI Merging System") that merges live footage with animated content. The live footage might be obtained and input by reading from the live action footage storage 920 to obtain live action footage, by reading from the live action metadata storage 924 to obtain details such as presumed segmentation in captured images segmenting objects in a live action scene from their background (perhaps aided by the fact that the green screen 910 was part of the live action scene), and by obtaining CGI imagery from the rendering engine 950.

A merging system 960 might also read data from rule sets for merging/combining storage 962. A very simple example of a rule in a rule set might be "obtain a full image including a two-dimensional pixel array from live footage, obtain a full image including a two-dimensional pixel array from the rendering engine 950, and output an image where each pixel is a corresponding pixel from the rendering engine 950 when the corresponding pixel in the live footage is a specific color of green, otherwise output a pixel value from the corresponding pixel in the live footage."

The merging system 960 might include computer processing capabilities, image processing capabilities, one or more processors, program code storage for storing program instructions executable by the one or more processors, as well as user input devices and user output devices, not all of which are shown. The merging system 960 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 960, such as modifying boundaries of segmented objects, inserting blurs to smooth out imperfections, or adding other effects. Based on its inputs, the merging system 960 can output an image to be stored in a static image storage 970 and/or a sequence of images in the form of video to be stored in an animated/combined video storage 972.

Thus, as described, the visual content generation system 900 can be used to generate video that combines live action with computer-generated animation using various components and tools, some of which are described in more detail herein. While the visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
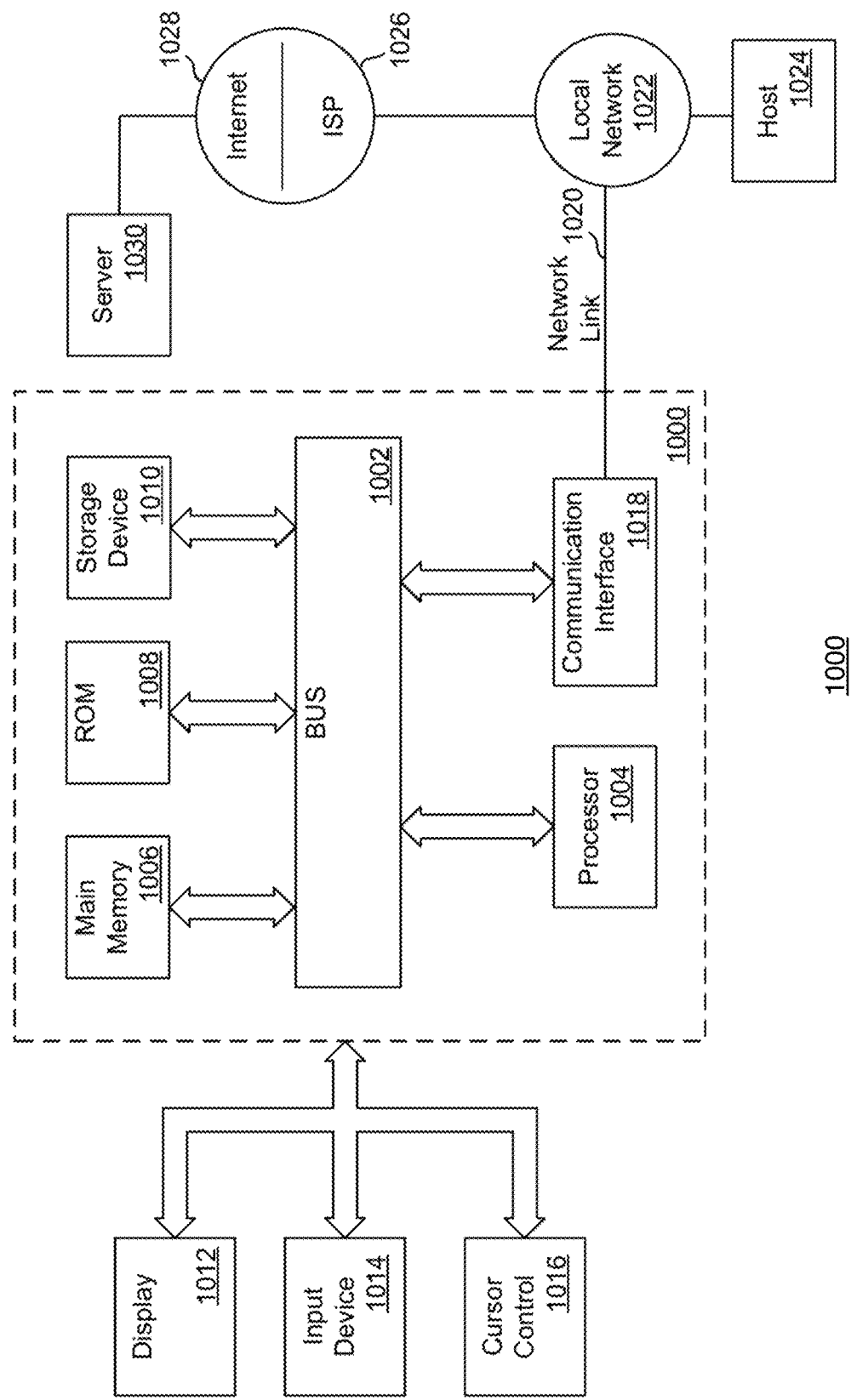
FIG. 7 is a block diagram of an example computer system, which may be used for embodiments described herein.

FIG. 7 is a block diagram of an example computer system 1000, which may be used for embodiments described herein. The computer system 1000 includes a bus 1002 or other communication mechanism for communicating information, and a processor 1004 coupled with the bus 1002 for processing information. The processor 1004 may be a general-purpose microprocessor, for example.

The computer system 1000 also includes a main memory 1006, such as a random access memory (RAM) or other dynamic storage device, coupled to the bus 1002 for storing information and instructions to be executed by the processor 1004. The main memory 1006 may also be used for storing temporary variables or other intermediate information during execution of instructions to be executed by the processor 1004. Such instructions, when stored in non-transitory storage media accessible to the processor 1004, render the computer system 1000 into a special-purpose machine that is customized to perform the operations specified in the instructions.

The computer system 1000 further includes a read only memory (ROM) 1008 or other static storage device coupled to the bus 1002 for storing static information and instructions for the processor 1004. A storage device 1010, such as a magnetic disk or optical disk, is provided and coupled to the bus 1002 for storing information and instructions.

The computer system 1000 may be coupled via the bus 1002 to a display 1012, such as a computer monitor, for displaying information to a computer user. An input device 1014, including alphanumeric and other keys, is coupled to the bus 1002 for communicating information and command selections to the processor 1004. Another type of user input device is a cursor control 1016, such as a mouse, a trackball, or cursor direction keys for communicating direction information and command selections to the processor 1004 and for controlling cursor movement on the display 1012. This input device 1014 typically has two degrees of freedom in two axes, a first axis (e.g., x) and a second axis (e.g., y), that allows the input device 1014 to specify positions in a plane.

The computer system 1000 may implement the techniques described herein using customized hard-wired logic, one or more ASICs or FPGAs, firmware, and/or program logic, which, in combination with the computer system, causes or programs the computer system 1000 to be a special-purpose machine. According to one embodiment, the techniques herein are performed by the computer system 1000 in response to the processor 1004 executing one or more sequences of one or more instructions contained in the main memory 1006. Such instructions may be read into the main memory 1006 from another storage medium, such as the storage device 1010. Execution of the sequences of instructions contained in the main memory 1006 causes the processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 1010. Volatile media includes dynamic memory, such as the main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 1002. Transmission media can also take the form of acoustic or light waves, such as those generated during radio wave and infrared data communications.

Various forms of media may be involved in carrying one or more sequences of one or more instructions to the processor 1004 for execution. For example, the instructions may initially be carried on a magnetic disk or solid-state drive of a remote computer. The remote computer can load the instructions into its dynamic memory and send the instructions over a network connection. A modem or network interface local to the computer system 1000 can receive the data. The bus 1002 carries the data to the main memory 1006, from which the processor 1004 retrieves and executes the instructions. The instructions received by the main memory 1006 may optionally be stored on the storage device 1010 either before or after execution by the processor 1004.

The computer system 1000 also includes a communication interface 1018 coupled to the bus 1002. The communication interface 1018 provides a two-way data communication coupling to a network link 1020 that is connected to a local network 1022. For example, the communication interface 1018 may be an integrated services digital network ("ISDN") card, cable modem, satellite modem, or a modem to provide a data communication connection to a corresponding type of telephone line. Wireless links may also be implemented. In any such implementation, the communication interface 1018 sends and receives electrical, electromagnetic, or optical signals that carry digital data streams representing various types of information.

The network link 1020 typically provides data communication through one or more networks to other data devices. For example, the network link 1020 may provide a connection through a local network 1022 to a host computer 1024 or to data equipment operated by an Internet Service Provider ("ISP") 1026. The ISP 1026 in turn provides data communication services through the worldwide packet data communication network now commonly referred to as the "Internet" 1028. The local network 1022 and the Internet 1028 both use electrical, electromagnetic, or optical signals that carry digital data streams. The signals through the various networks and the signals on the network link 1020 and through the communication interface 1018, which carry the digital data to and from the computer system 1000, are example forms of transmission media.

The computer system 1000 can send messages and receive data, including program code, through the network (s), the network link 1020, and the communication interface 1018. In the Internet example, a server 1030 might transmit a requested code for an application program through the Internet 1028, the ISP 1026, the local network 1022, and the communication interface 1018. The received code may be executed by the processor 1004 as it is received, and/or stored in the storage device 1010, or other non-volatile storage for later execution.

Operations of processes described herein can be performed in any suitable order unless otherwise indicated herein or otherwise clearly contradicted by context. Processes described herein may be performed under the control of one or more computer systems (e.g., the computer system 1000) configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program including a plurality of instructions executable by one or more processors. The computer-readable storage medium may be non-transitory. The code may also be carried by any computer-readable carrier medium, such as a transient medium or signal, e.g., a signal transmitted over a communications network.

Although the description has been described with respect to particular embodiments thereof, these particular embodiments are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Some embodiments are implemented as a non-transitory processor-readable medium including instructions executable by one or more digital processors. The processor-readable medium comprising one or more processor-readable instructions executable by the one or more digital processors for implementing embodiments described herein.

Some embodiments are implemented as processor implementable code or computer-readable code provided on a computer-readable medium. The computer-readable medium may comprise a non-transient storage medium, such as solid-state memory, a magnetic disk, optical disk, etc., or a transient medium such as a signal transmitted over a computer network.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A computer-implemented method performed by one or more digital processors for identifying image calibration data, the method comprising:
receiving an original image from a camera, wherein the original image includes at least a portion of a calibration chart;
deriving a working image from the original image;
determining regions in the working image, wherein each region comprises a group of pixels having values within a predetermined criterion;
analyzing two or more of the regions to identify a candidate calibration chart in the working image;
identifying at least one region within the candidate calibration chart as a patch; and
predicting a location of one or more additional patches based on at least the identified patch.

2. The method of claim 1, further comprising filtering at least one portion of the regions based on shape.

3. The method of claim 1, wherein the determining of regions includes checking a size of a region.

4. The method of claim 1, further comprising adjusting an orientation of the candidate calibration chart.

5. The method of claim 1, further comprising computing image data based on at least one pixel value from the identified patch.

6. The method of claim 1, further comprising computing image data based on at least one pixel value from the identified patch, wherein the at least one pixel value is obtained from a middle area of the identified patch in the calibration chart to compute the image data.

7. The method of claim 1, further comprising generating an image parameter, wherein the image parameter includes a white balance parameter.

8. The method of claim 1, further comprising generating an image parameter, wherein the image parameter includes an exposure parameter.

9. A system for identifying image calibration data, the system comprising:
one or more processors; and
logic encoded in one or more non-transitory computer-readable storage media for execution by the one or more processors and when executed operable to cause the one or more processors to perform operations comprising:
receiving an original image from a camera, wherein the original image includes at least a portion of a calibration chart;
deriving a working image from the original image;
determining regions in the working image, wherein each region comprises a group of pixels having values within a predetermined criterion;
analyzing two or more of the regions to identify a candidate calibration chart in the working image;
identifying at least one region within the candidate calibration chart as a patch; and
predicting a location of one or more additional patches based on at least the identified patch.

10. The system of claim 9, wherein the logic when executed is further operable to cause the one or more processors to perform operations comprising filtering at least one portion of the regions based on shape.

11. The system of claim 9, wherein the determining of regions includes checking a size of a region.

12. The system of claim 9, wherein the logic when executed is further operable to cause the one or more processors to perform operations comprising adjusting an orientation of the candidate calibration chart.

13. The system of claim 9, wherein the logic when executed is further operable to cause the one or more processors to perform operations comprising computing image data based on at least one pixel value from the identified patch.

14. The system of claim 9, wherein the logic when executed is further operable to cause the one or more processors to perform operations comprising computing image data based on at least one pixel value from the identified patch, wherein the at least one pixel value is obtained from a middle area of the identified patch in the calibration chart to compute the image data.

15. The system of claim 9, wherein the logic when executed is further operable to cause the one or more processors to perform operations comprising generating an image parameter, and wherein the image parameter includes a white balance parameter.

16. The system of claim 9, wherein the logic when executed is further operable to cause the one or more processors to perform operations comprising generating an image parameter, and wherein the image parameter includes an exposure parameter.

17. A non-transitory computer-readable storage medium with program instructions stored thereon, the program instructions when executed by one or more processors are operable to cause the one or more processors to perform operations comprising:
receiving an original image from a camera, wherein the original image includes at least a portion of a calibration chart;
deriving a working image from the original image;
determining regions in the working image, wherein each region comprises a group of pixels having values within a predetermined criterion;
analyzing two or more of the regions to identify a candidate calibration chart in the working image;
identifying at least one region within the candidate calibration chart as a patch; and predicting a location of one or more additional patches based on at least the identified patch.

18. The computer-readable storage medium of claim 17, wherein the instructions when executed are further operable to cause the one or more processors to perform operations comprising filtering at least one portion of the regions based on shape.

19. The computer-readable storage medium of claim 17, wherein the determining of regions includes checking a size of a region.

20. The computer-readable storage medium of claim 17, wherein the instructions when executed are further operable to cause the one or more processors to perform operations comprising adjusting an orientation of the candidate calibration chart.

* * * * *